(No Model.)
A. B. WOOD.
SEED PLANTER
No. 285,336. Patented Sept. 18, 1883.
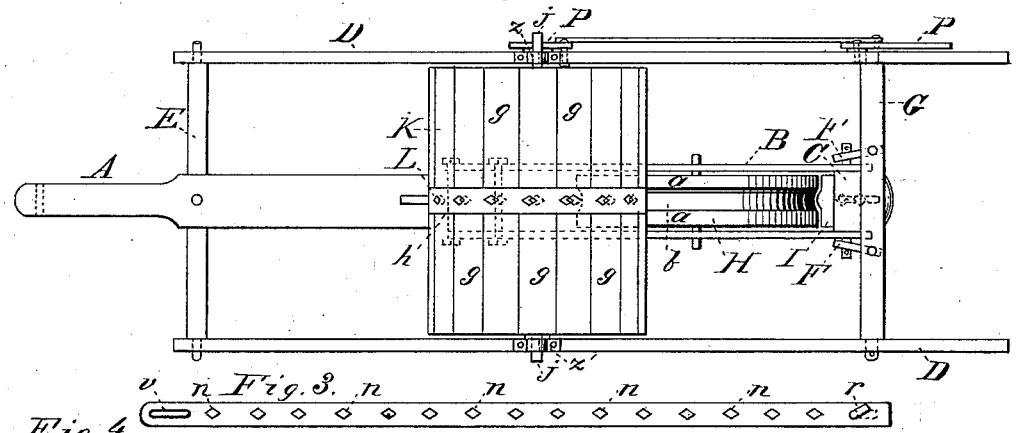
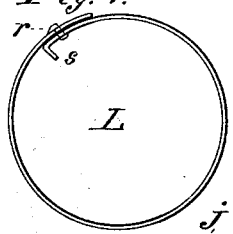
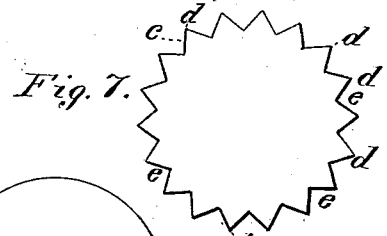
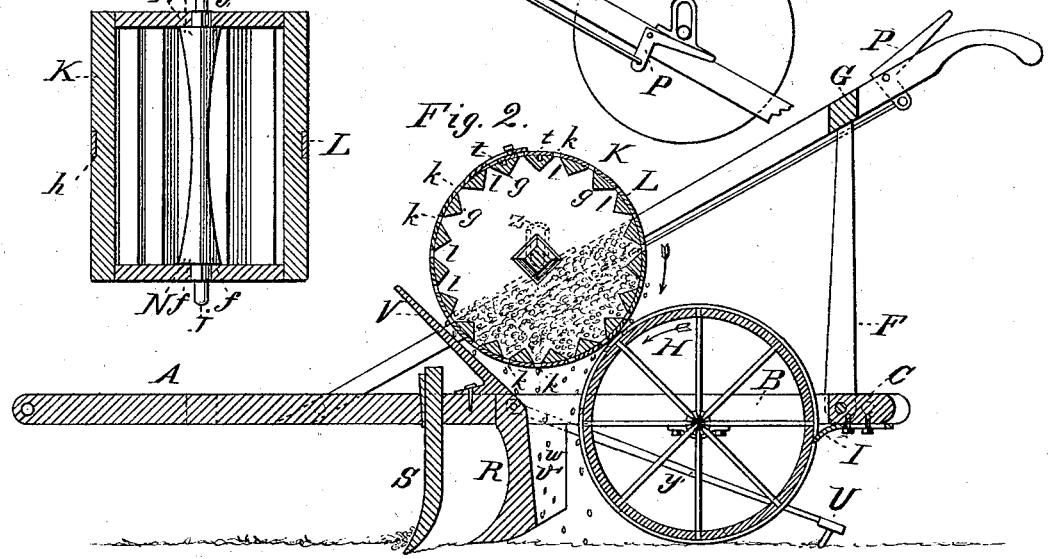
WITNESSES
Villette Anderson.
Philip C. Masi.
INVENTOR
A. B. Wood,
by Anderson & Smith
his ATTORNEYS

UNITED STATES PATENT OFFICE.

AUGUSTUS B. WOOD, OF FOUNTAIN HILL, ARKANSAS.

SEED-PLANTER.

SPECIFICATION forming part of Letters Patent No. 285,336, dated September 18, 1883.

Application filed December 5, 1882. (No model.)

*To all whom it may concern:*

Be it known that I, AUGUSTUS B. WOOD, a citizen of the United States, residing at Fountain Hill, in the county of Ashley and State of Arkansas, have invented certain new and useful Improvements in Seed-Planters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and shows a plan view of the top. Fig. 2 is a longitudinal section. Figs. 3 and 4 are detail views of the hoop. Fig. 5 is a detail showing the seed-drum in section. Fig. 6 is a detail showing side view of angle-levers. Fig. 7 is a detail showing plan view of drum-head.

This invention has relation to devices for planting corn and seed, especially cotton and sorghum seed; and the invention consists in the construction and novel arrangement of devices, as hereinafter set forth, and particularly pointed out in the claims appended.

In the accompanying drawings, the letter A designates the main draft-beam of the frame, to which is bolted rear extension, B, the rear ends of which are secured to the cross-bar C.

D D are the handles, which are attached to the ends of the front cross-bar, E, and, extending upward and rearward obliquely, are supported by the standards F and upper cross-bar, G.

H represents the supporting and drive wheel, which is constructed with a broad tread, $a$, having a central groove or rounded furrow, which is continuous around the tread, as indicated at $b$. The journals of this wheel are seated in bearings attached to the rear extensions, B, of the main beam, so that said wheel rotates between the extensions.

K designates the seed-drum. In constructing this drum the heads $c$ are formed with peripheral angular points $d$, having angular intervals $e$ to receive the triangular bars $g$, which connect the heads and form the cylindrical wall of the drum. The drum is turned true in a lathe, and around its central portion a channel, $h$, about one-quarter or one-half inch deep and one and a quarter inch wide, is formed to receive the adjustable hoop L. In cutting the channel $h$ discharge-openings $k$ are made around the drum, each opening leading from an angular recess, $l$, which is bounded by the oblique sides of two adjacent bars or staves, $g$, and extends from head to head.

The hoop L is made of suitable length to extend around the drum, and of proper width to fit in the channel $h$. It is provided with a series of diamond-shaped or square openings, $n$, which are separated by an interval, so that their centers are as far apart as the centers of the discharge-openings $k$ of the drum. At one end the hoop-gage L is formed with a bent flange or catch, $s$, and the drum is provided in the channel $h$ with a series of transverse slots, $t$, arranged at a distance of about one-sixteenth of an inch apart, with one of which said flange or catch is designed to engage when the hoop is in place. This end of the hoop is also provided with a button or fastening, $r$, designed to engage a slot, $v$, in the other end of the hoop, so as to hold it tightly bound around the drum in the channel $h$, as shown in the drawings. The hoop is adjustable, so that the position of its openings with reference to the openings $n$ of the drum can be varied, and the size of the discharging-apertures can thereby be enlarged or reduced according to requirement.

The shaft N of the drum is provided with shoulders $f$, against which the heads abut, the journals $j$ extending through the heads and engaging bearings $z$ and $z'$ on the handles of the machine. The body portion of the shaft is of rectangular form in cross-section, tapering, however, on each end toward the center, so that during the revolutions of the drum it will have a tendency to guide the corn or seed toward the central portion of the drum, where the discharging-openings are made. The journal-bearings $z$ and $z'$ are made in elongated or slot form, so that the drum will have some vertical play, and will properly engage the peripheral portion $a$ of the supporting-wheel H, which, when the machine is in motion, causes the drum to rotate. In order to raise the drum from the supporting-wheel, angle-levers P, or slides, are connected to the handles, and so arranged as to be easily manipulated by the operator in rear.

R designates the opener, which is secured to the beam A in front of the supporting-wheel H, and is provided with lateral rearwardly-extending rings $w$, bounding a vertical rear passage, $v'$, through which the seed is guided to the furrow. In front of the opener is arranged the colter S. Coverers U, connected to the main beam by suitable arms, $y$, follow in rear of the channeled main wheel H, and serve to draw the loose soil over the seed.

An oblique guide, V, is attached to the main beam over the stem of the opener, and extends upward and forward under the lower front portion of the drum. By means of this attachment the seed falling from the forward openings of the drum is guided to the passage in rear of the opener. A scraper, I, is attached to the rear cross-bar of the frame, and is designed to engage the rounded channel of the drive-wheel, serving to keep it clear and unobstructed as it moves forward under the drum.

A sectional hopper adapted to be rotated by contact with the ground has been encircled by a band provided with diamond-shaped apertures, the band being rigidly secured to one section of the hopper, while the other section is arranged to turn in the band to regulate the size of the seed-discharge openings. A cylindrical seed-box has been rotated by direct contact with the drive-wheel of the planter. A perforated adjustable band on the seed-box has been used, and a coverer following the opener is old in seed-planters, and I do not claim any of these constructions, broadly.

Having described this invention, what I claim, and desire to secure by Letters Patent, is—

1. The centrally-channeled seed-drum having the centrally-arranged discharging-openings, and the adjustable hoop-gage L, and the rectangular shaft N, tapered from its ends toward its central portion, substantially as specified.

2. The combination, in a seeding-machine, with the channeled seed-drum K, having the journals $j$ and vertically-extended bearings $z\ z'$, of the centrally-channeled supporting and drive wheel H, engaging said drum, substantially as specified.

3. A seeding-machine, having the channeled drive-wheel H, the channeled drum K, and hoop-gage L, the opener R, scraper I, and oblique front guide, V, under the forward portion of the drum, leading to the passage in rear of the opener, substantially as specified.

In testimony whereof I affix my signature in presence of two witnesses.

AUGUSTUS BALDWIN WOOD.

Witnesses:
W. W. WOOD,
T. E. BAKER.